(12) United States Patent
Anim-Mensah et al.

(10) Patent No.: US 9,986,886 B2
(45) Date of Patent: Jun. 5, 2018

(54) WAREWASHER WITH DRAIN WATER TEMPERING SYSTEM WITH ENERGY RECOVERY USING PLATE HEAT EXCHANGERS

(71) Applicants: Alexander R. Anim-Mensah, Centerville, OH (US); Bryan J. Waechter, Dayton, OH (US)

(72) Inventors: Alexander R. Anim-Mensah, Centerville, OH (US); Bryan J. Waechter, Dayton, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 18 days.

(21) Appl. No.: 14/849,922

(22) Filed: Sep. 10, 2015

(65) Prior Publication Data

US 2016/0081528 A1  Mar. 24, 2016

Related U.S. Application Data (60) Provisional application No. 62/053,456, filed on Sep. 22, 2014.

(51) Int. Cl.
| | | |
|---|---|---|
| *A47L 15/42* | (2006.01) | |
| *A47L 15/00* | (2006.01) | |
| *D06F 39/00* | (2006.01) | |

(52) U.S. Cl.
CPC ....... *A47L 15/4285* (2013.01); *A47L 15/0023* (2013.01); *A47L 15/0031* (2013.01); *A47L 15/0047* (2013.01); *A47L 15/0057* (2013.01); *A47L 15/4214* (2013.01); *A47L 15/4219* (2013.01); *A47L 15/4291* (2013.01); *D06F 39/006* (2013.01); *Y02B 40/54* (2013.01)

(58) Field of Classification Search
None
See application file for complete search history.

(56) References Cited

U.S. PATENT DOCUMENTS

| | | |
|---|---|---|
| 3,946,802 A | 3/1976 | Christenson |
| 4,219,044 A | 8/1980 | Wilson |
| 4,326,551 A | 4/1982 | Voorhees |
| (Continued) | | |

FOREIGN PATENT DOCUMENTS

| | | |
|---|---|---|
| DE | 2447428 | 4/1975 |
| DE | 9410453 | 12/1994 |
| (Continued) | | |

OTHER PUBLICATIONS

PCT, International Search Report and Written Opinion, International Application No. PCT/US2015/051327; dated Dec. 1, 2015, 13 pages.

(Continued)

*Primary Examiner* — Jason Ko
(74) *Attorney, Agent, or Firm* — Thompson Hine LLP (57) ABSTRACT

A warewash machine includes a housing at least in part defining a chamber for cleaning wares and a sump for collecting hot cleaning water that is recirculated through the chamber during cleaning. A drain path is provided for draining cleaning water from the sump and a fresh water input line includes at least a fresh water input that receives fresh water. A waste water heat recovery arrangement includes one or more plate heat exchanger units that transfer heat from the draining cleaning water to the incoming fresh water.

9 Claims, 6 Drawing Sheets

(56) References Cited

U.S. PATENT DOCUMENTS

| | | | |
|---|---|---|---|
| 4,529,032 | A | 7/1985 | Molitor |
| 4,546,511 | A | 10/1985 | Kaufmann |
| 5,660,193 | A | 8/1997 | Archer et al. |
| 5,816,273 | A | 10/1998 | Milocco et al. |
| 5,829,459 | A | 11/1998 | Milocco et al. |
| 6,591,846 | B1 | 7/2003 | Ferguson et al. |
| 8,146,612 | B2 | 4/2012 | Brunswick et al. |
| 8,176,926 | B2 | 5/2012 | Gaus et al. |
| 8,684,071 | B2 | 4/2014 | Andersson et al. |
| 2007/0143914 | A1 | 6/2007 | Shirai et al. |
| 2010/0024844 | A1 | 2/2010 | Brunswick et al. |

FOREIGN PATENT DOCUMENTS

| | | |
|---|---|---|
| DE | 102009054345 A1 | 3/2011 |
| EP | 2614764 A2 | 7/2013 |
| KR | 20080058129 | 6/2008 |
| WO | WO 2011/091940 | 8/2011 |

OTHER PUBLICATIONS

PCT, International Search Report and Written Opinion, International Application No. PCT/US2015/029030, dated Jul. 13, 2015, 12 pages.

WAREWASHER WITH DRAIN WATER TEMPERING SYSTEM WITH ENERGY RECOVERY USING PLATE HEAT EXCHANGERS

CROSS-REFERENCES

The application claims the benefit of U.S. Provisional Application Ser. No. 62/053,456, filed Sep. 22, 2014, which is incorporated herein by reference.

TECHNICAL FIELD

This application relates generally to warewashers and, more particularly, to a warewasher with a drain water tempering system.

BACKGROUND

In some commercial warewash machines, drain water is at a temperature above that mandated by plumbing codes for draining. This undesired result is due to the fact that cleaning water and rinse water used for cleaning and rinsing in commercial machines are both typically well above the applicable limit temperature. In order to cool the drain water, fresh cold water is sometimes flushed down the drain with the drain water to lower water temperature. A tempering kit is used for this purpose, which allows fresh water to mix with the waste/drain water to bring overall temperature down to the acceptable level before being discharged to the drain. In the operation of these warewash machines, the amount of waste water exiting the machine must also be compensated for by the same amount of fresh water, which is required to be heated and used in the machine.

Energy efficiency continues to be a significant issue in the field of warewash machines, particularly commercial warewash machines that tend to be high volume machines. It is known to provide heat recovery systems for recovering some heat from drain water that is being purged from the machine as exemplified by U.S. Pat. No. 5,660,193. U.S. Pat. No. 8,146,612 discloses a system in which heat from the drain water is recovered utilizing a counterflow serpentine pipe arrangement.

Nonetheless, it would be desirable to provide a warewash machine with a new and advantageous waste water energy recovery system.

SUMMARY

In one aspect, a warewash machine includes a housing at least in part defining a chamber for cleaning wares and a sump for collecting hot cleaning water that is recirculated through the chamber during cleaning. A drain path is provided for draining cleaning water from the sump. A fresh water input line includes at least a fresh water input that receives fresh water. A waste water heat recovery arrangement includes: a self-contained plate heat exchanger unit including a waste water input, a waste water output, a fresh water input, a fresh water output and a heat exchange volume within the unit. The fresh water input is operatively connected to receive water from the fresh water input line, the waste water input is operatively connected to receive cleaning water draining along the drain path. A plurality of heat exchanger plates are arranged within the heat exchange volume to define at least one fresh water flow path along one side of a first plate and a waste water flow path along an opposite side of the first plate, such that heat from waste water traveling along the waste water flow path is transferred through the first plate to fresh water traveling along the fresh water flow path.

In one implementation, multiple fresh water flow paths and multiple waste water flow paths are present on opposite sides of multiple respective plates within the heat exchange volume.

In one implementation, the heat plate heat exchanger unit is located within a footprint of the housing of the warewash machine.

In one implementation, the heat plate heat exchanger unit is located outside a footprint of the housing of the warewash machine.

In one implementation, the machine further includes: a rinse system including a booster heater; wherein the fresh water output of the plate heat exchanger unit is operatively connected to deliver fresh water to the booster heater.

In one implementation, the drain path includes a line strainer upstream of the plate heat exchanger unit.

In one implementation, the chamber includes at least one screen member for capturing food debris from water entering the sump.

In one implementation, the chamber includes both a coarse screen member and a fine screen member.

In another aspect, a warewash machine includes a housing at least in part defining a chamber for cleaning wares, a sump for collecting hot cleaning water that is recirculated through the chamber during cleaning and a rinse system including a booster heater that feeds multiple spray nozzles within the chamber. A drain path is operatively connected to drain cleaning water from the sump, wherein a drain pump or drain valve located along the drain path. A fresh water input line includes an associated infeed flow control valve. A waste water heat recovery arrangement includes a plate heat exchanger unit including a waste water input, a waste water output, a fresh water input, a fresh water output and a heat exchange volume within the unit, wherein the fresh water input is operatively connected to receive water from the fresh water input line, the waste water input is operatively connected to receive cleaning water draining along the drain path, the fresh water output is operatively connected to feed water to the booster heater, wherein a plurality of heat exchanger plates are arranged within the heat exchange volume. A controller is connected for controlling operation of each of the drain pump or drain valve, the infeed flow control valve and the rinse system. The controller is configured to selectively carry out a drain down operation in which at least some fresh water pre-heated in the plate heat exchanger unit is delivered through the warewash machine via the rinse system and back to the drain path in order to flush food debris through the plate heat exchanger unit.

In a further aspect, a method of recovering energy from waste water being delivered out of a warewash machine involves: delivering the waste water along a drain path that includes a plate heat exchanger unit with multiple internal heat exchange plates; and delivering fresh water along a fresh water input path that passes through the plate heat exchanger unit such that heat from the waste water is passed to the fresh water via heat transfer through the heat exchange plates within the plate heat exchanger unit.

In one implementation of the method, in the case of each of a multiplicity heat exchange plates, fresh water travels along one side of the heat exchange plate and waste water travels along an opposite side of the heat exchange plate.

In one implementation of the method, the fresh water traveling along the one side of the heat exchange plate flows in an opposite direction of the waste water traveling along the opposite side of the heat exchange plate.

In one implementation of the method, at least some fresh water pre-heated in the plate heat exchanger unit is delivered through the warewash machine and back to the drain path during a draining operation of the machine in order to flush food debris through the plate heat exchanger unit.

The details of one or more embodiments are set forth in the accompanying drawings and the description below. Other features, objects, and advantages will be apparent from the description and drawings, and from the claims.

DETAILED DESCRIPTION

Figure 1A:
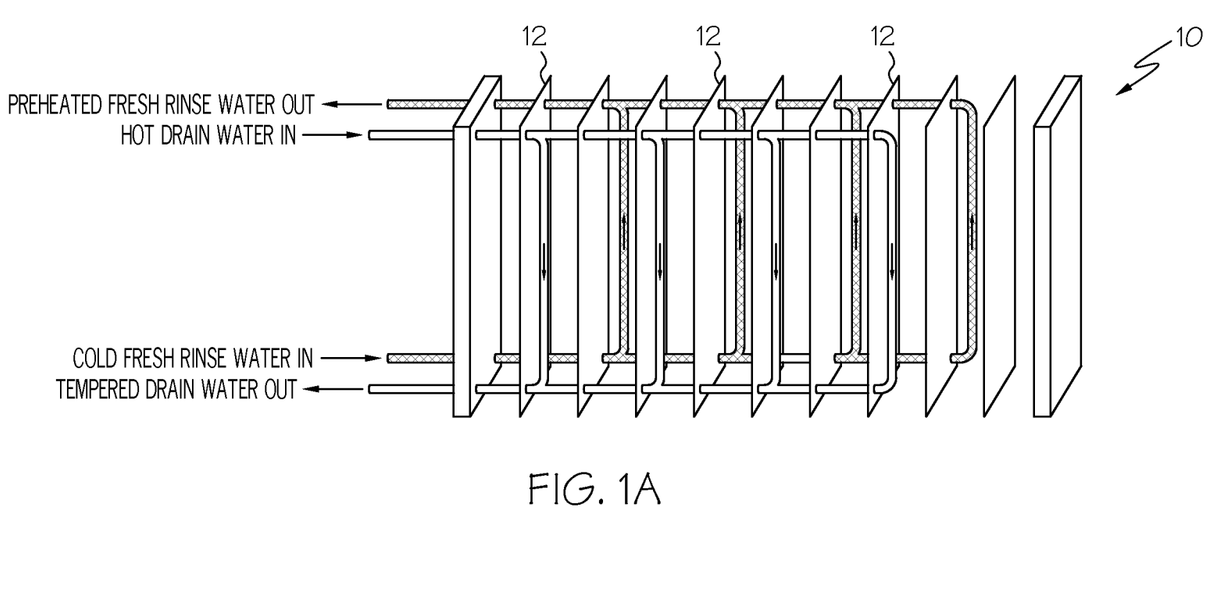
Figure 1B:
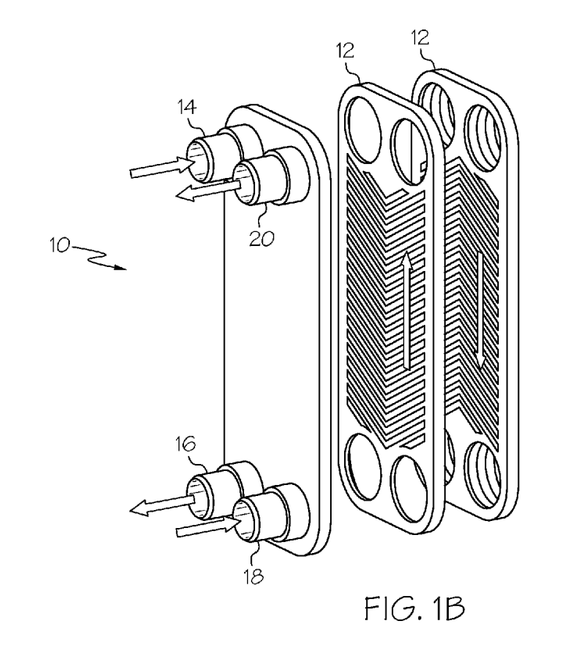

Referring to FIGS. 1a and 1b, schematic depictions of a plate heat exchanger 10 are shown, where the flow pattern over the surfaces of plates 12 of the plate heat exchanger unit are shown. The heat exchange from draining waste water on one side of a plate 12 within the unit to incoming fresh water on the opposite side of the plate 12 is via heat transfer through the plate 12, such that the draining waste water is tempered while the fresh water is preheated. The plate heat exchangers may be of suitable size, configuration and plate spacing to accommodate the needs of a specific warewasher machine.

Figure 2:
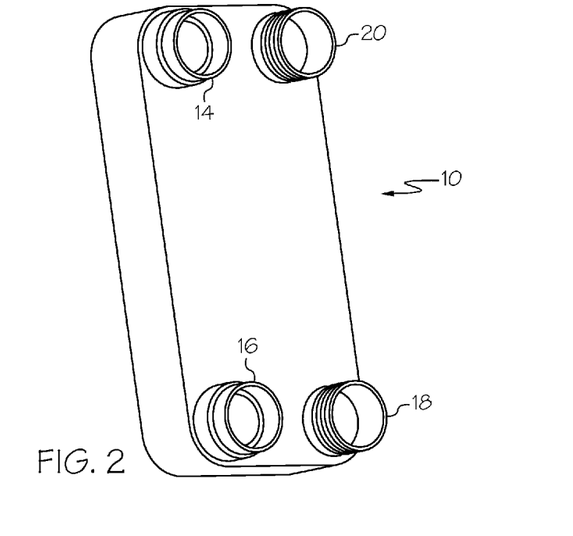

FIG. 2 shows an assembled embodiment of a plate heat exchanger 10, which is a self-contained unit having a waste water input 14, a waste water output 16, a fresh water input 18, a fresh water output 20 and a heat exchange volume (with multiple heat exchange plates) within the unit housing. In the illustrated embodiment, all inputs and outputs are located on one side of the unit.

FIGS. 3-6 depict how the plate heat exchanger unit 10 can be integrated into an existing or new warewashing machine.

Figure 3:
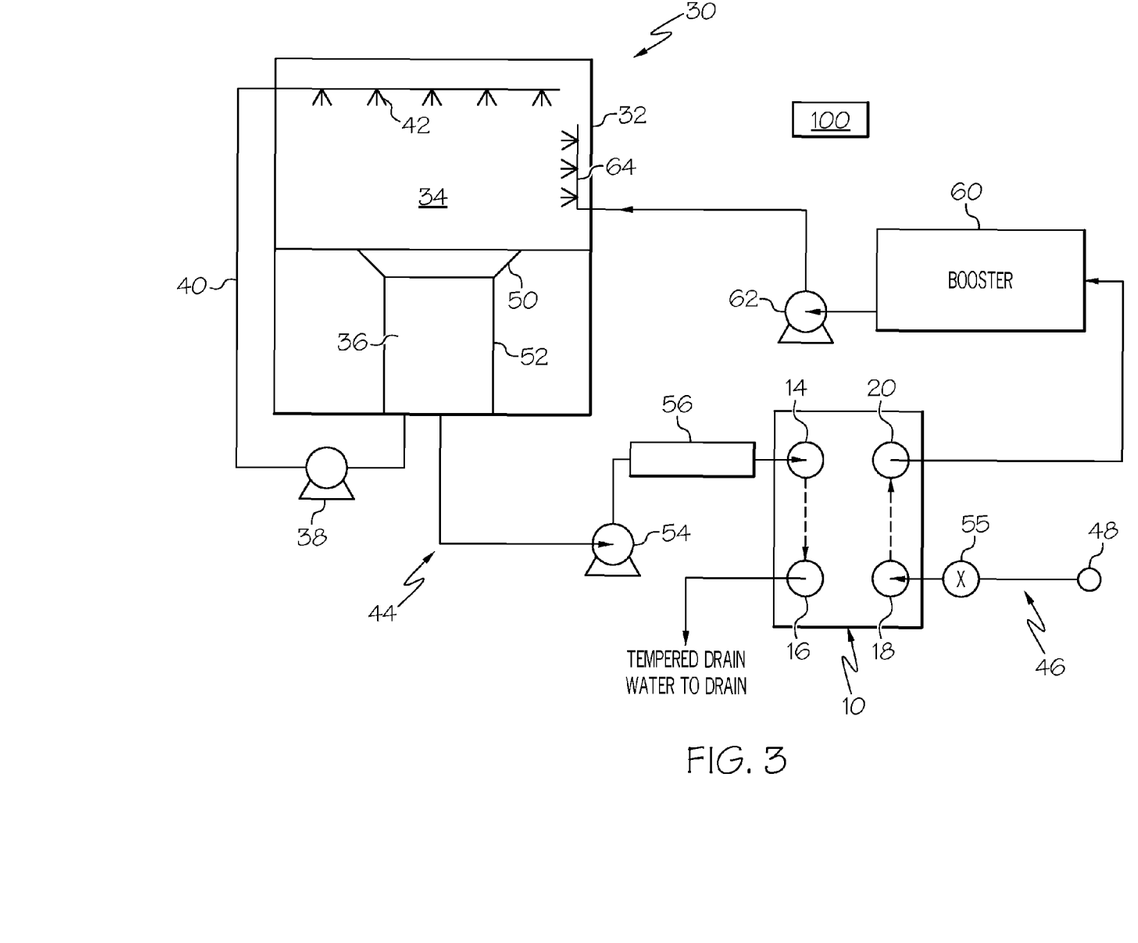

In FIG. 3, the machine 30 includes a housing 32 at least in part defining a chamber 34 for cleaning wares. A sump 36 within the chamber collects hot cleaning water that is recirculated in the chamber, such as via a pump 38, recirculation line 40 and wash nozzles 42 during cleaning. Although the wash nozzles are shown on the top of the chamber 34 in the schematic of FIG. 3, they could also, or alternatively, be located at the bottom and/or side of the chamber. A drain path 44 is connected to the sump for draining cleaning water from the sump. A fresh water input path 46 includes at least a fresh water input 48 that receives fresh water. The machine may include one or both of a course screen 50 and a fine screen 52 for filtering food debris from water entering the sump 36, or at least the drain path 44.

The drain path 44 includes a drain pump 54 and a line strainer 56, which further limits the delivery of food debris into the plate heat exchanger unit 10. The line strainer 56 may be used for precaution only. However, the line strainer may not be necessary since the plate heat exchanger unit 10 can be flushed through of debris with fresh preheated water every time the machine is shutdown for cleaning as will be described in more detail below. The machine includes a rinse system including a booster heater 60, where the fresh water output 20 of the plate heat exchanger unit 10 is operatively connected to deliver fresh water to the booster heater 60. Water from the booster may be delivered into the machine, such as via a rinse pump 62 and rinse nozzles 64. Although the rinse nozzles are shown on a side of the chamber 34 in the schematic of FIG. 3, they could and more commonly are located at the top and/or bottom of the chamber. The plate heat exchanger unit 10 may be located within the footprint of the machine housing if space permits, or outside the footprint of space does not permit.

Figure 4:
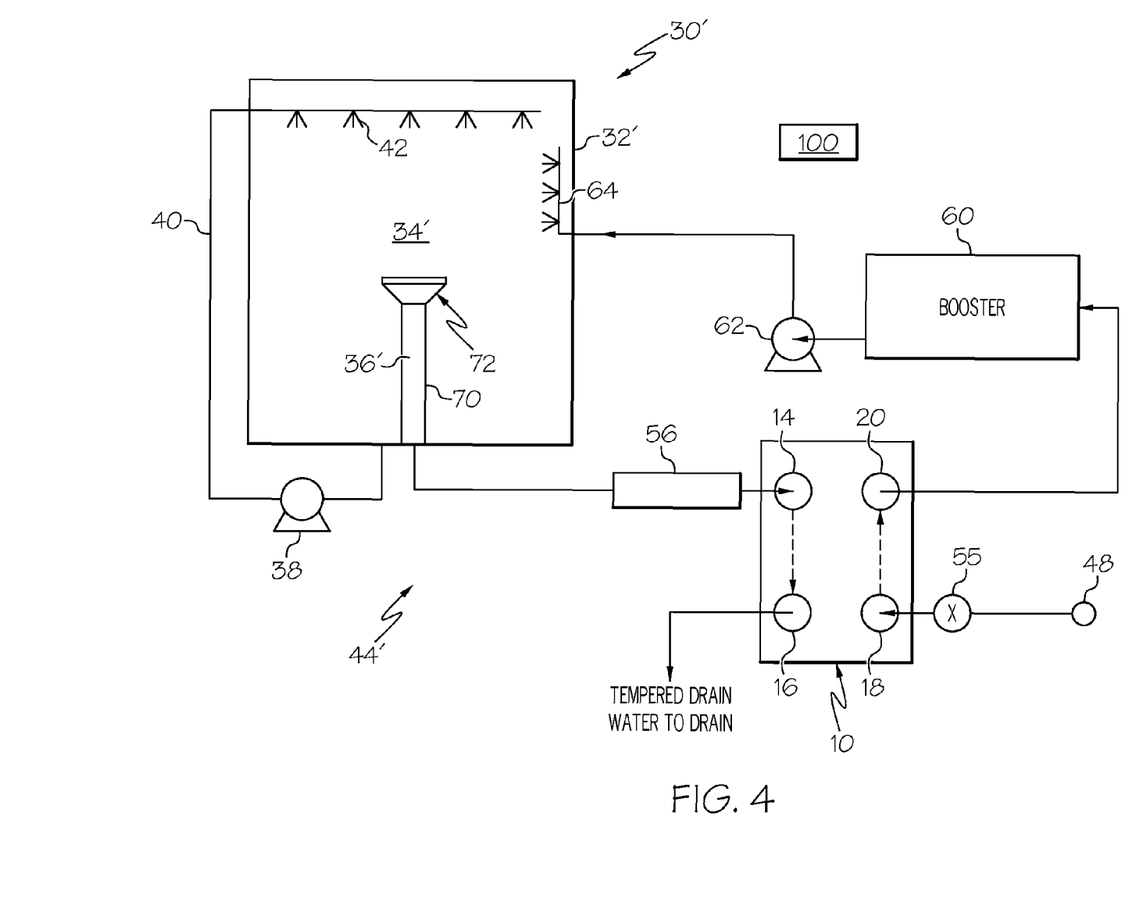

In FIG. 4, the washing machine 30' includes a similar configuration with housing 32', chamber 34' and sump 36'. The drain path 44' is a gravity flow path, with no pump required. Within the chamber 34' a skimmer pipe 70 with associated screen 72 are used for water flow to the drain path 44'. In this case the skimmer pipe 70 may be lifted (manually or automatically) to carry out the machine shutdown draining process.

Figure 5:
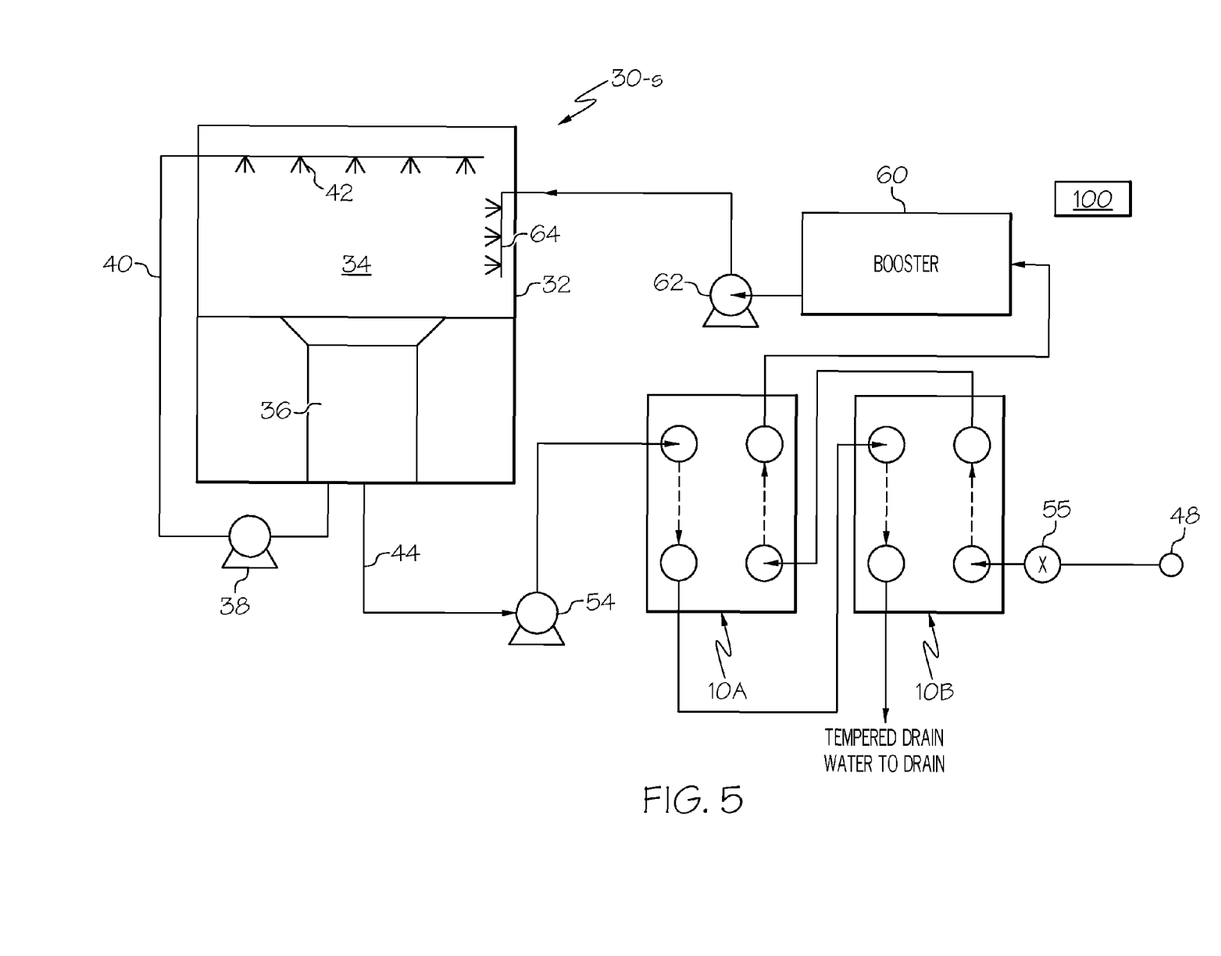
Figure 6:
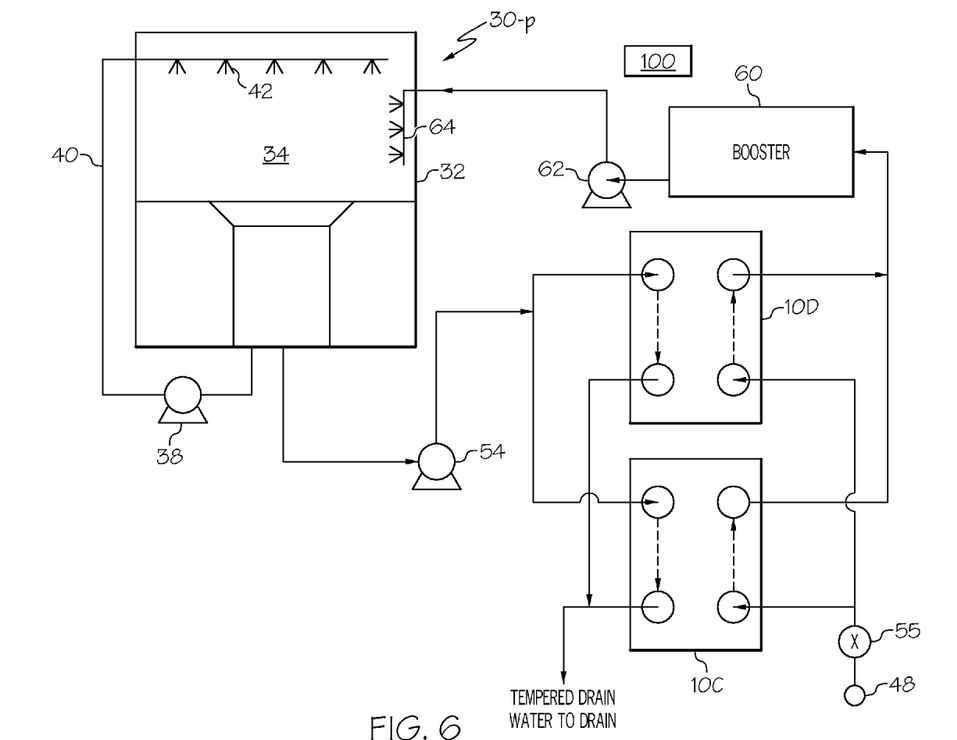

In the embodiment of FIG. 5, the machine 30-s utilizes multiple plate heat exchanger units 10A, 10B arranged in series, so that all draining waste water flows through each unit 10A, 10B and all incoming fresh water flows through each unit 10B, 10A. In the embodiment of FIG. 6 the machine 30-p uses multiple heat exchange units 10C and 10D as well, but the units are arranged in parallel so that a portion of the draining waste water flows through unit 10A and another portion flows through unit 10B while a portion of the incoming fresh water flow through unit 10A and another portion flows through unit 10B. While two plate heat exchanger units are shown in each embodiment, it is recognized that three or more are also possible. In any case, such arrangements with multiple plate heat exchanger units can improve heat transfer efficiencies, particularly where spaced constraints of the machine limit the potential size of a single heat exchange unit.

In application, the plate heat exchanger unit 10 should be selected such that it does not impede or delay the usual machine draining time when the machine is shutdown. During the whole machine draining operation, the hot waste wash solution being sent to drain (e.g., as controlled by operation of the drain pump 54 or a drain valve in the case of a gravity drain machine) should be tempered to acceptable temperature before discharge, which tempering is achieved by letting the fresh cold water flow (e.g., by opening of fresh water valve 55) until all the waste is drained. The preheated fresh water during the tempering process at shutdown is delivered back to the wash tank (e.g., after passing through the booster 60 and under control of the rinse pump 62) and then back along the drain path 44, 44') to flush the plate heat exchanger out of debris, thereby preventing clogging of the plate heat exchanger units. This extended drain down operation provides a self-cleaning feature of the process. In practice, it is common to shut a machine down for cleaning every 2 hours of operation, which means the plate heat exchanger unit 10 should be cleaned sufficiently in a day's operation.

For the purpose of carrying out the normal cleaning operations (e.g., wash cycles of the machine) and the drain down operations (e.g., for cleaning) the machine typically includes a controller 100 that is connected to effect the desire operations of the various machine components (e.g., wash pump 38, the drain pump 54 or drain valve, the rinse pump 62, the booster heater elements and the fresh water feed control valve 55). The drain down control may be a timed operation that assures that the complete draining of the sump occurs and that draining continues for some additional period to assure that some fresh hot water delivered into the chamber by the rinse system is also delivered down the drain path to flush the plate heat exchanger unit(s).

As used herein, the term controller is intended to broadly encompass any circuit (e.g., solid state, application specific integrated circuit (ASIC), an electronic circuit, a combinational logic circuit, a field programmable gate array (FPGA)), processor (e.g., shared, dedicated, or group—including hardware or software that executes code) or other component, or a combination of some or all of the above, that carries out the control functions of the machine or the control functions of any component thereof.

The described system may provide advantages such as tempering waste drain while preheating fresh cold water to machine over a compact plate heat exchanger, extracting heat from a waste stream for reuse, compactness of the whole heat exchange system, use of gravity rather than a pump in some applications, saving water and recovering energy, self-cleaning of the plate heat exchanger any time the machine is shut down for cleaning hence reducing/preventing clogging, and tempering waste water below acceptable IMC standard (i.e., below 140 F) before discharge.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application. For example, in the illustrated embodiments the draining waste water and incoming fresh water are set up to move in a countercurrent flow arrangement through the plate heat exchanger unit(s) for better efficiency. However, it is recognized that in some embodiments the flow could also be a co-current arrangement through the plate heat exchanger unit(s). Moreover, the configuration of the warewasher could vary (e.g., it could be a conveyor warewasher with any number of zones, where source of the waste water could be from any of the zones, or a batch-type warewasher of any suitable configuration).

What is claimed is:

1. A warewash machine, comprising:
   a housing at least in part defining a chamber for cleaning wares;
   a sump for collecting hot cleaning water that is recirculated through the chamber during cleaning;
   a drain path for draining cleaning water from the sump;
   a fresh water input line including at least a primary fresh water input that receives fresh water;
   a waste water heat recovery arrangement including:
      a self-contained plate heat exchanger unit including a waste water input, a waste water output, a fresh water input, a fresh water output and a heat exchange volume within the unit,
      wherein the fresh water input is operatively connected to receive water from the fresh water input line, the waste water input is operatively connected to receive cleaning water draining along the drain path,
      wherein a plurality of heat exchanger plates are arranged within the heat exchange volume to define at least one fresh water flow path along one side of a first plate and a waste water flow path along an opposite side of the first plate, such that heat from waste water traveling along the waste water flow path is transferred through the first plate to fresh water traveling along the fresh water flow path;
   a rinse system including a booster heater, wherein the fresh water output of the self-contained plate heat exchanger unit is operatively connected to deliver fresh water to the booster heater,
   a drain pump or drain valve along the drain path;
   a fresh water control valve along the fresh water input line;
   and a controller connected for controlling operation of each of the drain pump or drain valve, the fresh water control valve and the rinse system, the controller configured to selectively carry out a sump drain down operation, in between wash cycles, such that during the sump drain down operation (i) the sump is fully drained of the cleaning water through the self-contained plate heat exchanger unit and (ii) at least some additional fresh water that was pre-heated in the self-contained plate heat exchanger unit is then delivered through the warewash machine via the rinse system and to the drain path in order to flush food debris through the self-contained plate heat exchanger unit.

2. The warewash machine of claim 1 wherein multiple fresh water flow paths and multiple waste water flow paths are present on opposite sides of multiple plates within the heat exchange volume.

3. The warewash machine of claim 1 wherein the self-contained plate heat exchanger unit is located within a footprint of the housing of the warewash machine.

4. The warewash machine of claim 1 wherein the self-contained plate heat exchanger unit is located outside a footprint of the housing of the warewash machine.

5. The warewash system of claim 1 wherein the drain path includes a line strainer upstream of the self-contained plate heat exchanger unit.

6. The warewash machine of claim 5 wherein the chamber includes at least one screen member for capturing food debris from water entering the sump.

7. The warewash machine of claim 6 wherein the chamber includes both a coarse screen member and a fine screen member.

8. The warewash machine of claim 1 wherein the self-contained plate heat exchanger unit is one of multiple self-contained plate heat exchanger units that comprise the waste water heat recovery arrangement.

9. A warewash machine, comprising:
   a housing at least in part defining a chamber for cleaning wares;
   a sump for collecting hot cleaning water that is recirculated through the chamber during cleaning;
   a drain path for draining cleaning water from the sump;
   a fresh water input line including at least a primary fresh water input that receives fresh water;
   a waste water heat recovery arrangement including:
      a self-contained plate heat exchanger unit including a waste water input, a waste water output, a fresh water input, a fresh water output and a heat exchange volume within the unit,
      wherein the fresh water input is operatively connected to receive water from the fresh water input line, the waste water input is operatively connected to receive cleaning water draining along the drain path,
      wherein a plurality of heat exchanger plates are arranged within the heat exchange volume to define at least one fresh water flow path along one side of a first plate and a waste water flow path along an opposite side of the first plate, such that heat from waste water traveling along the waste water flow path is transferred through the first plate to fresh water traveling along the fresh water flow path;
   wherein the self-contained plate heat exchanger unit is one of multiple self-contained plate heat exchanger units that comprise the waste water heat recovery arrangement;
   wherein the multiple self-contained plate heat exchanger units are arranged in parallel and the fresh water input line includes parallel paths through the multiple self-contained plate heat exchanger units;
   wherein the warewasher includes:

a rinse system including a booster heater, wherein the fresh water output of the self-contained plate heat exchanger unit is operatively connected to deliver fresh water to the rinse system, a drain pump or drain valve along the drain path, a fresh water control valve along the fresh water input line, and a controller connected for controlling operation of each of the drain pump or drain valve, the fresh water control valve and the rinse system, the controller configured to selectively carry out a sump drain down operation, in between wash cycles, such that during the sump drain down operation (i) the sump is fully drained of the cleaning water through the multiple self-contained plate heat exchanger units and (ii) at least some additional fresh water that was pre-heated in the multiple self-contained plate heat exchanger units is then delivered through the warewash machine via the rinse system and to the drain path in order to flush food debris through the multiple self-contained plate heat exchanger units.

\* \* \* \* \*